Figure 1:
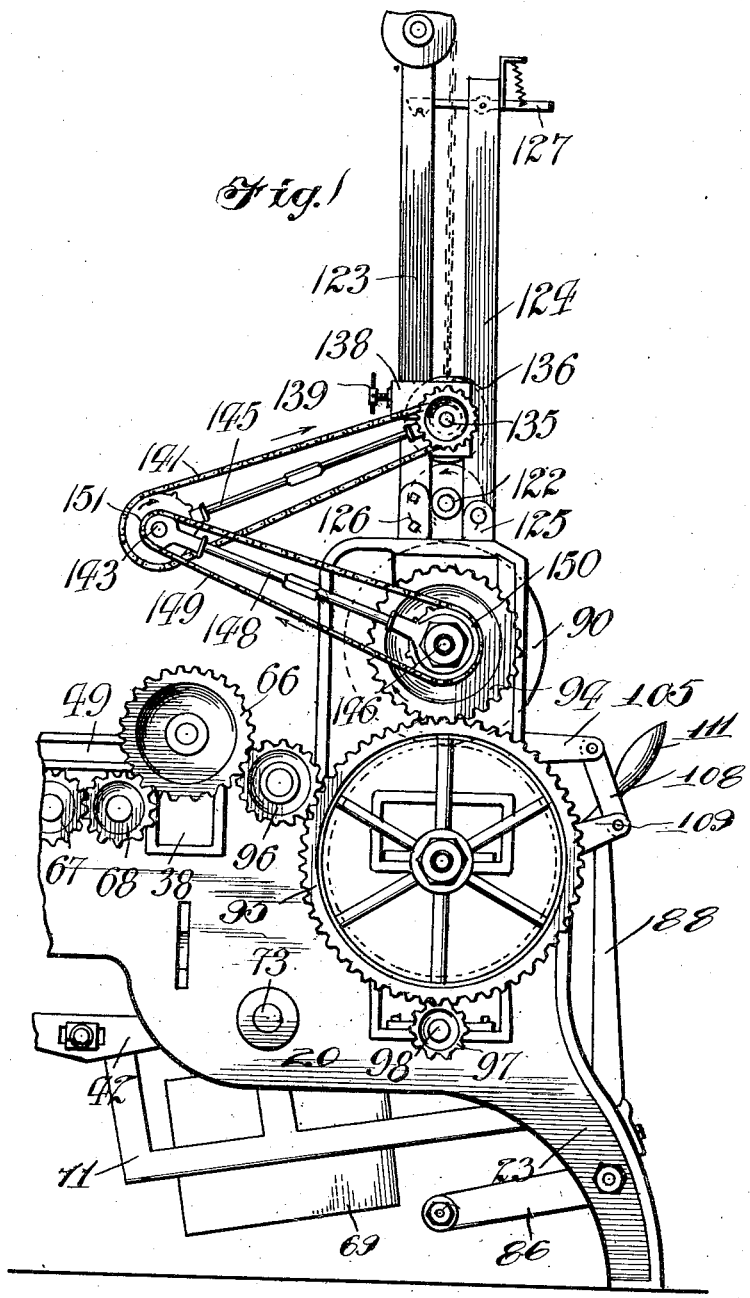

No. 847,418. PATENTED MAR. 19, 1907.
C. LICHTENSTADT.
APPARATUS FOR REWINDING FABRICS.
APPLICATION FILED AUG. 4, 1904.

7 SHEETS—SHEET 1.

Witnesses:
J. B. Weir
Robert H. Weir

Inventor:
Charles Lichtenstadt,
by Bond, Adams, Pickard & Jackson.
his Attys.

No. 847,418. PATENTED MAR. 19, 1907.
C. LICHTENSTADT.
APPARATUS FOR REWINDING FABRICS.
APPLICATION FILED AUG. 4, 1904.

7 SHEETS—SHEET 2.

Witnesses:
J. B. Weir
Robert H. Weir

Inventor:
Charles Lichtenstadt,
by Bond, Adams, Pickard & Jackson,
his Attys.

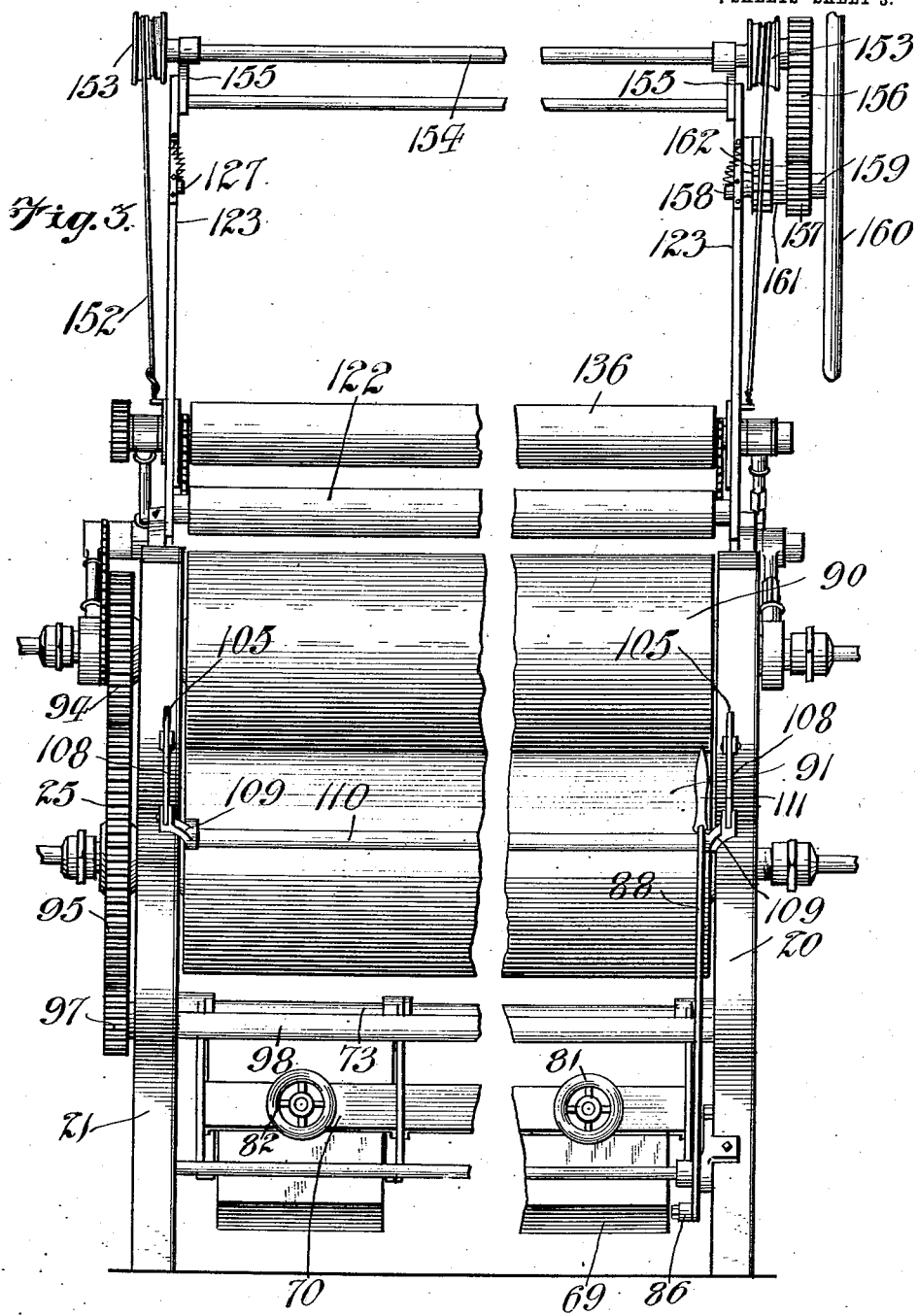

No. 847,418. PATENTED MAR. 19, 1907.
C. LICHTENSTADT.
APPARATUS FOR REWINDING FABRICS.
APPLICATION FILED AUG. 4, 1904.
7 SHEETS—SHEET 4.
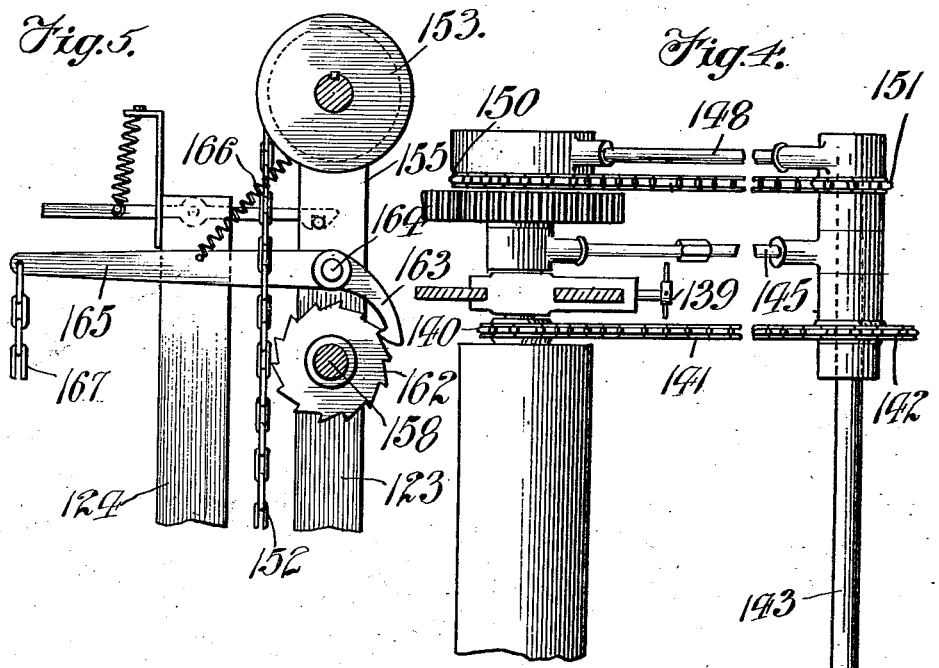

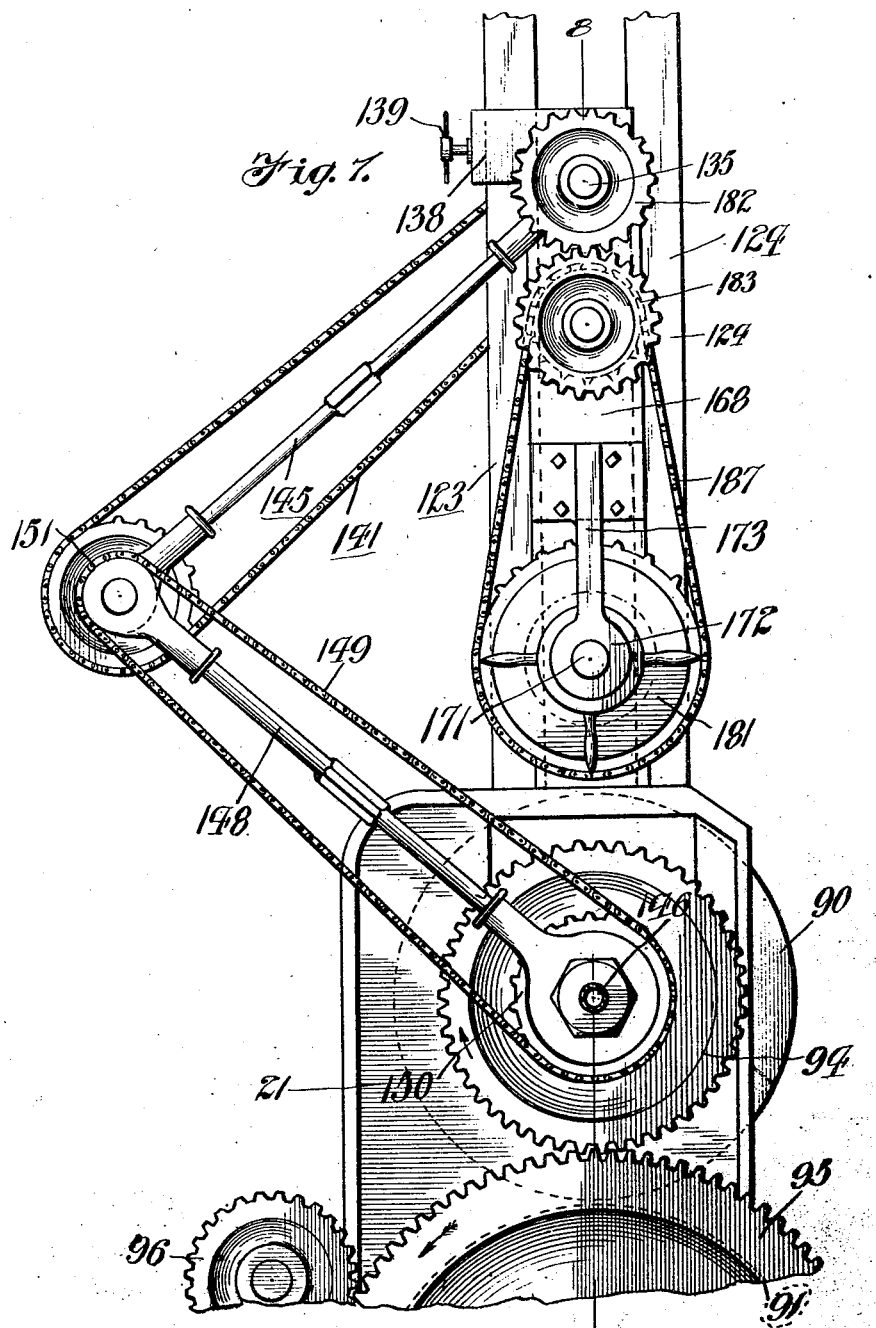

No. 847,418. PATENTED MAR. 19, 1907.
C. LICHTENSTADT.
APPARATUS FOR REWINDING FABRICS.
APPLICATION FILED AUG. 4, 1904.

7 SHEETS—SHEET 6.

Witnesses:
J. B. Weir
Robert H. Weir

Inventor:
Charles Lichtenstadt
by Bond, Adams, Pickard & Jackson
his Attys.

No. 847,418. PATENTED MAR. 19, 1907.
C. LICHTENSTADT.
APPARATUS FOR REWINDING FABRICS.
APPLICATION FILED AUG. 4, 1904.
7 SHEETS—SHEET 7.
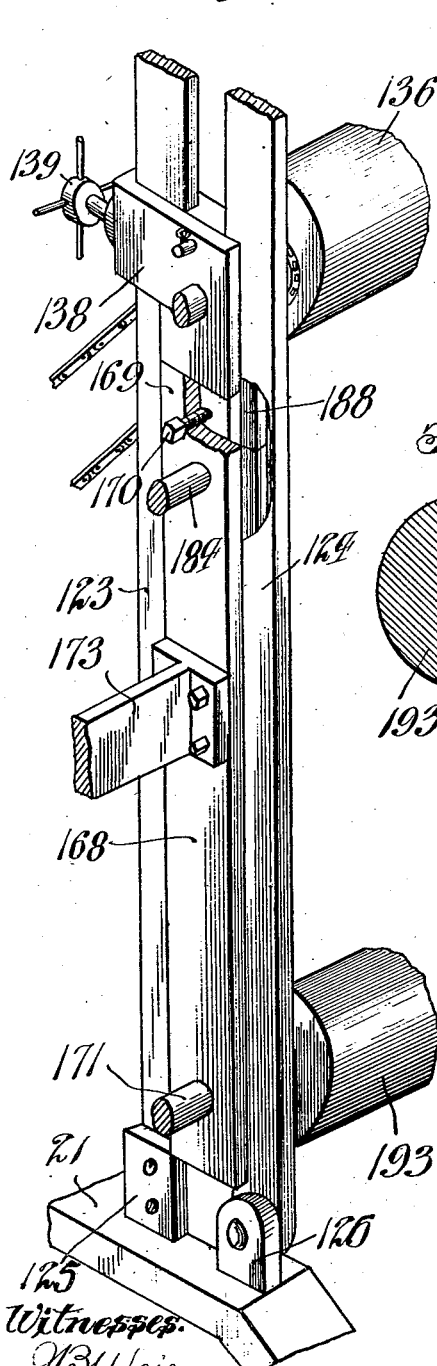
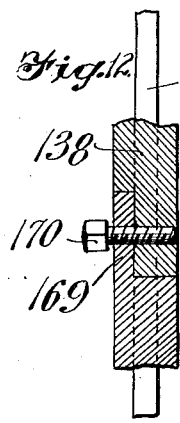
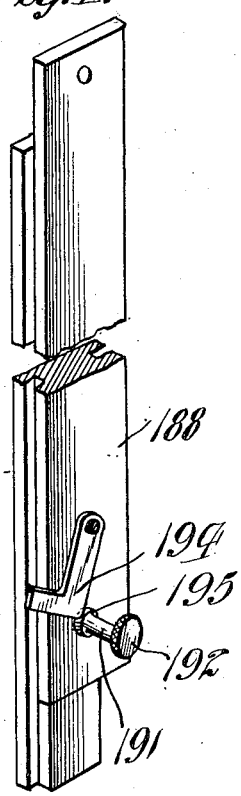
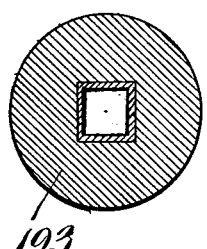
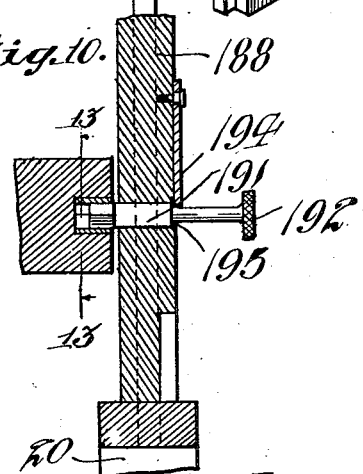
Witnesses:
J. B. Weir
Robert H. Weir
Inventor:
Charles Lichtenstadt,
by his Attys.

UNITED STATES PATENT OFFICE.

CHARLES LICHTENSTADT, OF CHICAGO, ILLINOIS.

APPARATUS FOR REWINDING FABRICS.

No. 847,418.   Specification of Letters Patent.   Patented March 19, 1907.

Application filed August 4, 1904. Serial No. 219,466.

*To all whom it may concern:*

Be it known that I, CHARLES LICHTENSTADT, a citizen of the United States, and a resident of Chicago, in the county of Cook and State of Illinois, have invented certain new and useful Improvements in Apparatus for Rewinding Fabrics, of which the following is a specification, reference being had to the accompanying drawings.

My invention relates to mechanism for rewinding cloth and other fabrics and while it has principally for its object to provide new and improved rewinding mechanism arranged to coöperate with mechanism for applying water-repellent composition to fabrics, and particularly mechanism adapted for use in connection with the composition-applying mechanism illustrated and described in my Patent No. 736,413, dated August 18, 1903, my invention in its broadest aspect is not restricted to use with such machine, as it may be employed in any other situation to which it is adapted.

My invention, broadly considered, consists in providing improved means for equalizing the power applied to the rewinding-mandrel.

More specifically, it consists in providing driving rolls or cylinders at opposite sides of the mandrel arranged to engage the fabric thereon from above and below and by their frictional engagement to cause it to rotate.

It also consists in providing means for applying power axially to the mandrel instead of to the fabric thereon, thereby preserving the fabric from contact with the rolls.

It further consists in providing friction-clutch mechanism between the source of power and the mandrel for regulating the speed of the mandrel, and consequently the tension upon the fabric.

My invention also includes certain other features, which will be hereinafter set forth.

Figure 2:
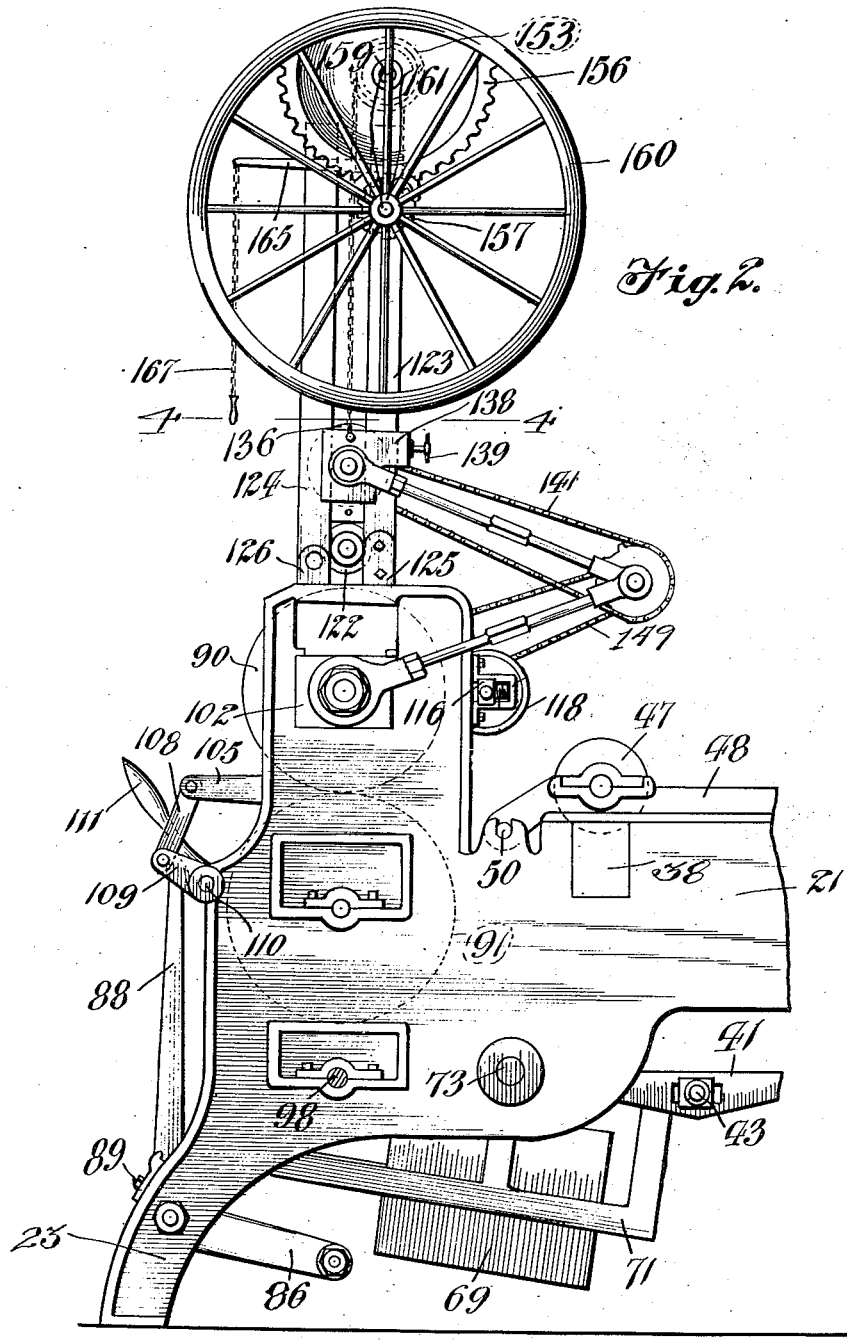
Figure 8:
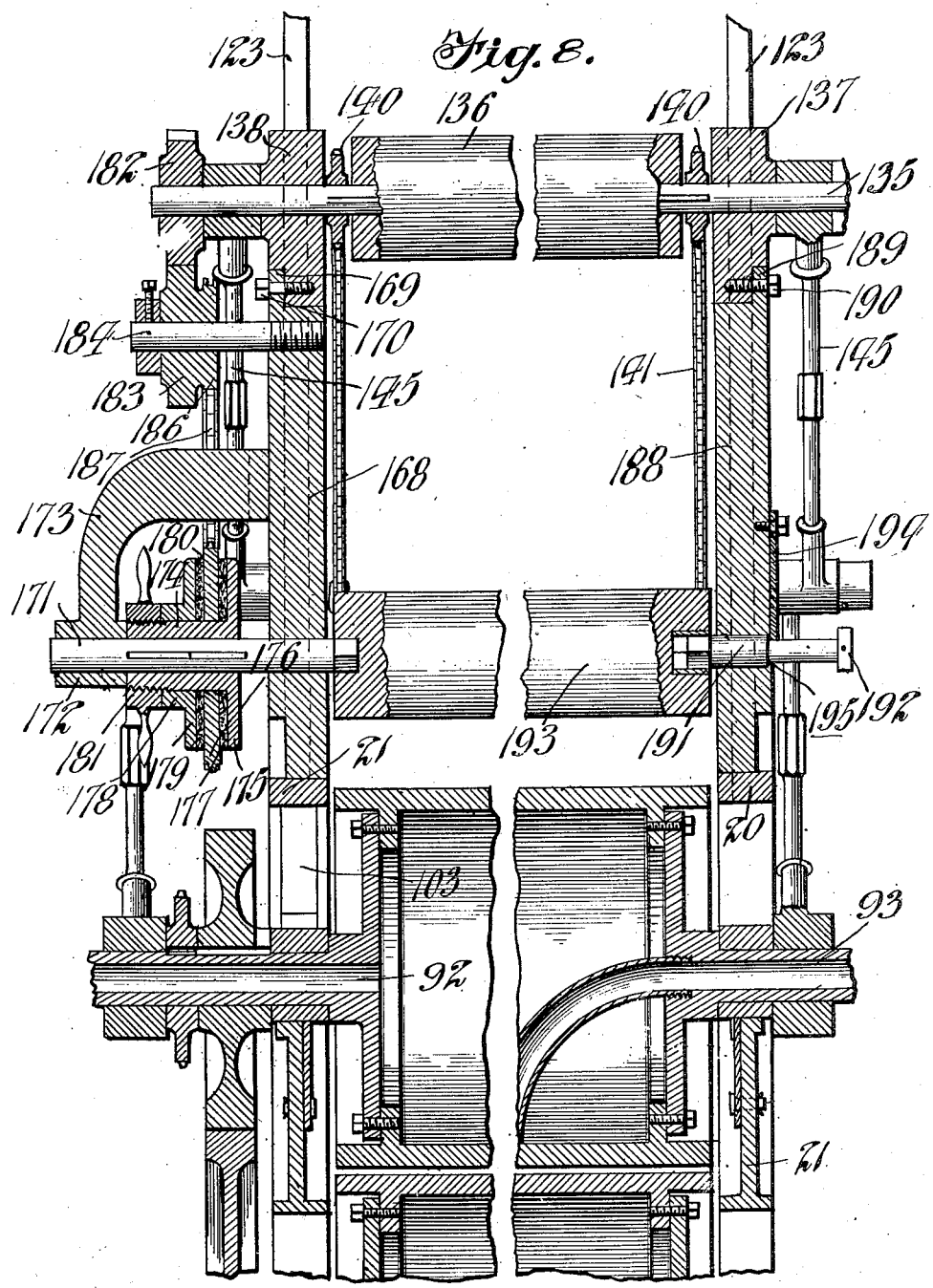

In the accompanying drawings, which illustrate the application of my improvements to the machine illustrated and described in my patent above referred to, Figure 1 is a partial side elevation illustrating my improved form of rewinding mechanism, in which I employ positively-driven rolls at opposite sides of the rewinding-mandrel. Fig. 2 is a view similar to Fig. 1, taken at the opposite side of the machine. Fig. 3 is a partial end view of the construction shown in Fig. 1. Fig. 4 is a partial horizontal section on line 4 4 of Fig. 2. Fig. 5 is an enlarged detail illustrating the supporting mechanism for the upper rewinding-roll. Fig. 6 is an enlarged detail illustrating the guiding mechanism for the upper rewinding-roll. Fig. 7 is an enlarged side view illustrating a more improved form of rewinding mechanism in which the rewinding-mandrel is driven by power applied axially thereto and is provided with means for regulating the tension upon the fabric. Fig. 8 is a vertical section on line 8 8 of Fig. 7. Fig. 9 is a perspective view illustrating the manner in which several parts of the rewinding mechanism shown in Fig. 7 are mounted. Fig. 10 is a sectional view illustrating the manner of removably supporting the positively-driven mandrel in place. Fig. 11 is a perspective view of the removable block shown in Fig. 10. Fig. 12 is a partial sectional view illustrating the manner of securing the upper end of said removable block in place, and Fig. 13 is a section on line 13 13 of Fig. 10.

It may be well to explain that the machine in connection with which my present improvements are illustrated, and which is fully illustrated and described in my said patent, comprises a pair of presser-rolls operating in connection with vertically-movable frames adapted to hold bars of water-repellant composition, said bars being arranged below said presser-rolls. The arrangement is such that the fabric passes between each presser-roll and the opposite bar of composition, first one surface of the fabric being treated and then the other, after which it passes between a pair of cylinders and thence to the rewinding mechanism. The bars of composition are pressed up against the fabric by counterbalance-weights carried in suitable frames which are so arranged that the weights may be adjusted to vary the pressure of the composition upon the fabric. When desired, the weights may be locked against operation by locking-levers. The presser-rolls are geared to the calendering-cylinders, which are in turn driven from a main drive-shaft. A number of such parts are shown in the drawings for the sake of clearly illustrating the general construction of the machine to which my improvement may be applied. For example, 20 21 indicate the side frames of the machine; 23, the legs which support the side frames; 38, one of the bars of composition; 41 42, parts of the frames which support said bars; 47, one of the presser-rolls; 48 49, pivoted bars in which the presser-rolls are journaled; 50, one of the pivots of said bars; 66, 67, 68, and 96, a series of gears by which the presser-rolls are driven from a gear 95, mounted on the shaft of the lower calendering-cylinder 91; 98, the main drive-shaft connected with the gear 95 by a pinion 97; 90, the upper calendering-cylinder, and 94 a gear connecting said cylinder with the gear 95. The counterbalance-frames are indicated by 70 and 71, the counterbalance-weights by 69, and the adjusting devices for adjusting said weights by 81 82.

88 indicates the lever for locking the counterbalance-weights against operation, and 86 the arm of said lever, through which it operates. The arm 86 may be thrown up against the frames 70 or 71, as the case may be, by operating the lever 88, thereby holding said frames against movement.

111 indicates a lever for vertically adjusting the upper calendering-roll, said lever acting through cranks 109, carried by a shaft 110, which extends across the frame of the machine. Said cranks are connected by links 108 with levers 105, which are pivotally supported at their inner ends and extend under the bearings of the upper calendering-roll. When the parts are in the position shown in Fig. 2, said calendering-roll is in its operative position, and the cranks 109 and links 110 are at an acute angle to each other, as shown. By operating the lever 111 the shaft 110 is rocked, bringing the cranks 109 and links 108 more nearly into line, thereby elevating the levers 105 and raising the upper calendering-roll.

118 indicates the rolls which engage the fabric as it passes up over the upper calendering-roll 90, all of which are fully illustrated and described in my said patent and separately form no part of my present invention.

122 indicates a mandrel on which the fabric is wound after it passes between the calendering-cylinders 90 91. As shown in Figs. 1 and 2, the mandrel is arranged to rise vertically between uprights 123 124, carried by the side frames 20 21 at each side of the cylinder 90. The upright 123 is rigidly secured to a suitable standard 125, while the upright 124 is pivoted to a standard 126, secured to the side frame on which it is carried. It will be understood that similar uprights are provided at each side of the machine. By this construction the uprights 124 may be turned down for the removal of the mandrel with the roll of fabric wound upon it. The uprights are locked together in operative position by a spring-latch 127, as shown in Fig. 1.

Coming now to the description of my present improvements, 136 indicates a rewinding roll or cylinder which is mounted between the uprights 123 124 above the mandrel 122, the ends of its shaft 135 being fitted in sliding blocks 137 138, which fit between said uprights in such manner as to move readily vertically to adjust the vertical position of the roll 136. Screw-clamps 139 are provided, by which the blocks 137 138 may be secured at various heights.

As best shown in Fig. 4, the shaft 135 carries near each end of the roll 136 a sprocket-wheel 140, which sprocket-wheels are connected, respectively, by chains 141 with sprocket-wheels 142, mounted upon a shaft 143, arranged parallel with the roll 136 and journaled in the ends of connecting-rods 144 145, which are pivoted to the end portions of the shaft 135. It will thus be seen that the shaft 143 may swing in the arc of a circle about the shaft 135 as a center and that such swinging of the shaft 143 will not affect the operation of the chains 141, through which the shaft 135 is rotated, as hereinafter described. The shaft 143 is also pivotally connected with the axis 146 of the cylinder 90 by connecting-rods 147 148, as best shown in Fig. 1, so that the shaft 143 also swings about the axis 146 as a center. The shaft 143 is driven from the cylinder 90 by means of a sprocket-chain 149, which is fitted upon a sprocket-wheel 150, mounted upon the axis 146 of the cylinder 90, near one end thereof, and around a sprocket-wheel 151, mounted upon the shaft 143, as shown in Fig. 4. Obviously when the cylinder 90 rotates in the direction indicated by the arrow in Fig. 1 the shaft 143 is caused to rotate in the same direction, such motion being transmitted through chain 141 to roll 136, which is also driven in the same direction as the cylinder 90.

The length of the connecting-rods 145 and 148 is such that when they are approximately in line the roll 136 is at the outer or upper ends of the uprights 123 124. The roll 136 may, however, move inwardly or descend so as to lie close to the cylinder 90, the connecting-rods 145 and 148 then assuming an acute angular position with reference to each other, as shown in Fig. 1. In practice the roll 136 is raised sufficiently to permit the mandrel 122 to be inserted between said roll and the surface of the cylinder 90, so that the fabric wound upon the mandrel is engaged by said roll and cylinder, the roll 136 engaging its upper surface, while the cylinder 90 engages its lower surface. Consequently friction is applied to the fabric at both points as it is being rewound, thus equalizing the power applied to the roll and insuring the smooth rewinding of the fabric. The speed of the roll 136 may be regulated at pleasure by varying the size of one or more of the different sprocket-wheels; but, ordinarily adjustment is not necessary, as after the parts are once adjusted no further change is ordinarily required. Preferably the roll 136 is arranged to rotate so as to provide a surface speed slightly greater than that of the cylinder 90.

In order to provide for lifting the roll 136 out of engagement with the fabric and for supporting it when not in use, said roll is suspended by chains or cables 152 from drums 153, mounted near the ends of a shaft 154, journaled in suitable bearings 155, secured to the upper ends of the uprights 123, as best shown in Fig. 3. Said shaft 154 is provided at one end with a gear 156, which meshes with a pinion 157, mounted on a stud 158, fixedly secured to and projecting from one of the uprights 123, as best shown in Figs. 3 and 5. The pinion 157 is connected by a sleeve 159 with a hand-wheel 160, by which it may be rotated to rotate the shaft 154. A sleeve 161 connects the pinion 157 with a ratchet-wheel 162, also mounted on the stud 158, as best shown in Figs. 3 and 5. The object of the ratchet-wheel 162 is to provide for locking the roll 136 in an elevated position, and to this end a pawl 163 is provided, which is pivotally mounted upon a fixed pivot 164, carried by the upright 123, adjacent to the ratchet-wheel 162. The pawl 163 is provided with an extended arm or lever 165, as best shown in Fig. 5, to which is connected a spring 166, which operates to hold up the arm 165, and consequently holds the pawl 163 yieldingly in contact with the ratchet-wheel. A chain or cord 167 depends from the arm 165 for conveniently depressing said arm and releasing the ratchet-wheel 162 from the pawl 163, thereby permitting the roll 136 to descend.

When the mandrel is to be removed or put in place, the roll 136 is elevated by means of the hand-wheel 160 and is retained in its elevated position by the ratchet mechanism described. By pulling the chain 167 the roll 136 is released and descends to its operative position.

In rewinding certain very light fabrics, such as silks, it is desirable to provide means by which the tension upon the rewinding-roll may be accurately regulated and adjusted, and for this purpose in addition to the mechanism already described I have provided the further improvements shown principally in Figs. 7 and 8. The latter mechanism is in the form of an attachment adapted to be connected up with the rewinding mechanism illustrated in Figs. 1, 2, and 3 in the manner shown in Fig. 7. Such attachment consists of two parts adapted to be secured at the opposite sides of the machine between the uprights 123 124. The attachment which is applied to the left-hand side of the machine, as illustrated in the drawings, consists of a block 168, adapted to fit between the uprights 123 124, having its edges grooved for that purpose, as shown in Fig. 9.

It is also provided with a projecting flange 169 at its upper edge, which projects over the lower edge of the block 138 and is adapted to be secured thereto by a screw 170, as shown in Fig. 8. The lower end of the block 168 rests on the frame of the machine, as shown in Figs. 8 and 9. The block 168 carries near its lower end a shaft 171, which is arranged perpendicularly to the block and projects beyond the inner face thereof, as shown in Fig. 8. The outer end of the shaft 171 is journaled in a bearing 172 in the outer end of a bracket 173, which is preferably formed integral with the block 168 and projects laterally therefrom, its outer end being bent downward to receive the shaft 171. Mounted upon and keyed to the shaft 171 between the bearing 172 and the block 168 is a sleeve 174, having at or near its inner end a radial flange 175.

176 indicates a sprocket-wheel mounted upon the sleeve 174 adjacent to the flange 175. Between said flange and said sprocket-wheel, which is in the form of a disk, is packing 177, of leather or other suitable material, adapted to frictionally engage the adjoining surface of the flange 175 and sprocket-wheel 176.

178 indicates a second sleeve, which is mounted on the sleeve 174 and is provided with a radial flange 179, which is adjacent to the outer surface of the sprocket-wheel 176.

180 indicates friction-packing between the flange 179 and the outer surface of the sprocket-wheel 176.

The sleeve 178 is movable longitudinally upon the sleeve 174 to cause the sprocket-wheel 176 to be engaged more or less tightly between flanges 179 and 175.

When great pressure is applied to the sprocket-wheel 176, the sleeve 174 may be caused to rotate with the sprocket-wheel 176 at an equal rate of speed, and such speed may be reduced to any desired extent by simply releasing the pressure upon said sprocket-wheel. Since the sleeve 174 is keyed upon the shaft 171, the speed of said shaft depends upon the speed of said sleeve. In order to control such pressure, I provide a hand-wheel 181, which is screwed upon the outer end of the sleeve 174, as shown in Fig. 8, and bears against the outer end of the sleeve 178. I thus provide a friction-clutch by which the speed of the shaft 171 may be controlled without regard to the speed of the sprocket-wheel 176.

The sprocket-wheel 176 is driven from the shaft 135 of the rewinding-roll 136 by means of a pinion 182, which is mounted upon said shaft and meshes with a pinion 183, mounted on a stud 184, carried in the upper portion of the block 168, as best shown in Fig. 8. Said shaft 135 is connected with a sprocket-wheel 186, which sprocket-wheel is connected by a chain 187 with sprocket-wheel 176.

Thus the shaft 135 drives the sprocket-wheel 176 and through it the shaft 171.

The attachment at the opposite side of the machine consists of a block 188, similar to the block 168 in that it is provided with a flange 189 at its upper edge adapted to be secured by a bolt 190 to the block 137. The block 188 also fits between the uprights 123 124 and rests upon the frame 20 of the machine. The construction of the block 188 is best shown in Fig. 11. Said block carries an endwise-movable pin 191, which is adapted to project beyond the inner surface of said block and is provided at its outer end with a handpiece 192, by which it may be conveniently operated. Said pin 191 is in line with the shaft 171 and with the projecting inner end of said shaft serves to axially support a rewinding-mandrel 193, as best shown in Fig. 8. The inner ends of the shaft 171, and preferably that of the pin 191, are squared, so as to compel the mandrel 193 to rotate with the shaft 171. The mandrel 193 is put in place or removed by drawing out the pin 191, so as to permit the mandrel to be fitted upon the end of the shaft 171 or removed therefrom, as desired. When the mandrel is in place, the pin 191 is moved to its innermost position, where it fits in the socket provided for that purpose in the end of the mandrel and secures the mandrel in position. To prevent the pin 191 from accidentally moving outward, I provide a latch 194, pivoted to the block 188 adjacent to the pin 191 and adapted to swing down beyond a shoulder 195, formed by reducing the outer portion of the pin, as best shown in Figs. 8 and 10. When the pin is in its innermost position, the shoulder 195 lies flush with the outer surface of the block 188, and the latch 194 then extends beyond said shoulder, as shown in Fig. 10. The latch 194 is swung aside when the pin is to be drawn out.

With the attachment described all that is necessary to regulate the speed of the mandrel is to adjust the hand-wheel 181 to increase or reduce the friction upon the sprocket-wheel 176. Consequently the tension on the fabric may at all times be accurately regulated.

While my improved rewinding device is especially designed and arranged to coöperate with devices for applying composition to the fabric, so as to receive and rewind the fabric as it comes from the calendering-cylinders, as has been suggested, in its broadest aspect it is not restricted to use with such apparatus. Neither is my invention restricted to the specific details of the construction illustrated and described, except in so far as they are particularly claimed, as it includes, generically, the subject-matter of the broader claims.

While the roll 136 is shown as being movable vertically, I do not limit myself to arranging it to move in a vertical plane, as it may move inwardly or outwardly in any other suitable plane.

That which I claim as my invention, and desire to secure by Letters Patent, is—

1. A rewinding device, comprising a rewinding-mandrel, guides in which said mandrel is adapted to travel, and auxiliary driving mechanism for rotating said mandrel, said driving mechanism being adjustable with the mandrel as the roll of fabric thereon increases in diameter, substantially as described.

2. A rewinding device, comprising a mandrel, rotating cylinders above and below said mandrel and adapted to engage the fabric thereon for rewinding the same, one of said cylinders being movable toward and from the other, and positively-acting means for rotating said cylinders.

3. A rewinding device, comprising a mandrel, rotating cylinders above and below said mandrel and adapted to engage the fabric thereon for rewinding the same, means for moving said upper cylinder toward and from the other to compensate for increase in diameter of the roll of fabric, and positively-acting means for rotating said cylinders.

4. A rewinding device, comprising a mandrel, a vertically-movable rewinding-roll adapted to engage said mandrel for rotating the same, and positively-acting means for driving said roll in its different positions of adjustment, a roll engaging the opposite side of said mandrel, and means for driving the latter roll, substantially as described.

5. A rewinding device, comprising an arm pivotally supported near one end, an arm pivotally connected with the outer end portion of said first-mentioned arm, driving mechanism supported by said arms, rewinding mechanism, and means for driving said rewinding mechanism from the driving mechanism carried by said arms.

6. A rewinding device, comprising an arm pivotally supported near one end, an arm pivotally connected with the outer end portion of said first-mentioned arm, a wheel carried at the common axis of said arms, an outer wheel carried at the free end portion of said second arm, means operatively connecting said wheels, means for driving said first-mentioned wheel, rewinding mechanism, and means for driving said rewinding mechanism from said outer wheel.

7. A rewinding device, comprising a rewinding-mandrel, a roll arranged parallel therewith and movable toward said mandrel and away therefrom, a cylinder adapted to engage the fabric on said mandrel, and positively-acting means for driving said roll from said cylinder when in its different positions.

8. A rewinding device, comprising a rewinding-mandrel, a roll arranged parallel therewith and movable toward said mandrel and away therefrom, a cylinder adapted to engage the fabric on said mandrel, an intermediate shaft, links connecting said shaft with said cylinder, links connecting said shaft with said roll, driving devices carried by said shaft, means for rotating said shaft from said cylinder, and means for rotating said roll from said shaft, substantially as described.

9. A rewinding device, comprising a rewinding-mandrel, a roll arranged parallel therewith and movable toward said mandrel and away therefrom, a cylinder adapted to engage the fabric on said mandrel, positively-acting means for driving said roll from said cylinder, and means for vertically adjusting said roll, substantially as described.

10. A rewinding device comprising a mandrel, an outwardly and inwardly movable roll arranged parallel with said mandrel, means for driving said roll, guides for said roll, a movable support, friction clutch mechanism carried by said support and adapted to drive said mandrel axially, driving devices carried by said support for operating said friction clutch mechanism, and positively-acting means for actuating said driving devices from the driving means of said roll.

11. The combination of means for applying composition to fabrics, calendering-cylinders, a rewinding-mandrel adapted to engage one of said calendering-cylinders, a vertically-adjustable rewinding-roll at the opposite side of said mandrel, and means for driving said rewinding-roll, substantially as described.

CHARLES LICHTENSTADT.

Witnesses:
JOHN L. JACKSON,
HELEN M. COLLIN.